(12) United States Patent
Weykamp

(10) Patent No.: US 12,715,286 B2
(45) Date of Patent: Aug. 25, 2026

(54) REFUSE VEHICLE WITH ELECTRIC POWER TAKE-OFF

(71) Applicant: Oshkosh Corporation, Oshkosh, WI (US)

(72) Inventor: Nick Weykamp, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

(21) Appl. No.: 19/197,527

(22) Filed: May 2, 2025

(65) Prior Publication Data

US 2025/0340113 A1 Nov. 6, 2025

Related U.S. Application Data

(60) Provisional application No. 63/642,065, filed on May 3, 2024.

(51) Int. Cl.

| | |
|---|---|
| ***B60K 25/00*** | (2006.01) |
| ***B60K 13/04*** | (2006.01) |
| ***B60R 16/02*** | (2006.01) |
| ***B65F 3/02*** | (2006.01) |

(52) U.S. Cl.

CPC .............. *B60K 25/00* (2013.01); *B60K 13/04* (2013.01); *B60R 16/0215* (2013.01); *B65F 3/02* (2013.01); *B65F 2003/0269* (2013.01); *B65F 2003/0283* (2013.01)

(58) Field of Classification Search

CPC . B60K 25/00; B60K 13/04; B65F 3/02; B65F 3/00

See application file for complete search history.

(56) References Cited

U.S. PATENT DOCUMENTS

| | | | | |
|---|---|---|---|---|
| 5,368,436 | A * | 11/1994 | Freiburger | B65F 3/24 414/408 |
| 9,850,858 | B2 * | 12/2017 | Mouton | F02D 41/0002 |
| 11,136,187 | B1 * | 10/2021 | Koga | B65F 3/06 |
| 11,254,498 | B1 * | 2/2022 | Koga | B65F 3/02 |
| 11,702,283 | B2 * | 7/2023 | Koga | B60K 25/00 414/408 |
| 11,993,457 | B2 * | 5/2024 | Turner | B65F 3/06 |
| 12,077,375 | B2 * | 9/2024 | Koga | B60L 1/003 |
| 12,162,679 | B2 * | 12/2024 | Koga | B65F 3/06 |
| 12,226,662 | B2 * | 2/2025 | Koga | B65F 3/041 |
| 12,415,416 | B2 * | 9/2025 | Wallin | B60K 17/28 |

(Continued)

*Primary Examiner* — Jason D Shanske
*Assistant Examiner* — Tiffany L Webb
(74) *Attorney, Agent, or Firm* — Foley & Lardner LLP

(57) ABSTRACT

A refuse vehicle includes a chassis; a body assembly coupled to the chassis; a prime mover; an exhaust outlet fluidly coupled to the prime mover; a battery configured to store electrical energy; and an electric power take-off ("E-PTO") system including a plurality of components positioned within a housing that is coupled to the body assembly. The exhaust outlet is configured to emit exhaust gas generated by the prime mover. The housing is positioned rearward of a plane defined by a rearward surface of the exhaust outlet. The plurality of components of the E-PTO system include an electric motor electrically coupled to the battery and a hydraulic pump. The electric motor is configured to be driven by electrical energy provided by the battery to drive the hydraulic pump to provide pressurized hydraulic fluid to an accessory of the refuse vehicle.

11 Claims, 14 Drawing Sheets

(56) References Cited

U.S. PATENT DOCUMENTS

| | | | | |
|---|---|---|---|---|
| 2023/0356939 | A1* | 11/2023 | Wente | B65F 3/02 |
| 2024/0075815 | A1* | 3/2024 | Koga | F15B 11/17 |
| 2024/0359910 | A1* | 10/2024 | Wente | B65F 3/02 |
| 2025/0196667 | A1* | 6/2025 | Fraas | B60L 50/75 |
| 2025/0326575 | A1* | 10/2025 | Turner | B60L 1/003 |
| 2025/0343286 | A1* | 11/2025 | Verhagen | H01M 16/006 |
| 2025/0349281 | A1* | 11/2025 | Turner | G10K 11/17857 |
| 2025/0360786 | A1* | 11/2025 | Wallin | B65F 3/02 |

* cited by examiner

REFUSE VEHICLE WITH ELECTRIC POWER TAKE-OFF

CROSS-REFERENCE TO RELATED PATENT APPLICATIONS

This application claims the benefit of and priority to U.S. Provisional Application No. 63/642,065, filed May 3, 2024, the entire contents of which are hereby incorporated by reference herein.

BACKGROUND

Refuse vehicles collect a wide variety of waste, trash, and other material from residences and businesses. Operators of the refuse vehicles transport the material from various waste receptacles within a municipality to a storage or processing facility (e.g., a landfill, an incineration facility, a recycling facility, etc.).

SUMMARY

One embodiment relates to a refuse vehicle. The refuse vehicle includes a chassis supporting a plurality of tractive elements; a body assembly coupled to the chassis; a prime mover coupled to at least one of the chassis or the body assembly; an exhaust outlet fluidly coupled to the prime mover; a battery configured to store electrical energy; and an electric power take-off ("E-PTO") system including a plurality of components positioned within a housing that is coupled to the body assembly. The exhaust outlet is configured to emit exhaust gas generated by the prime mover. The housing is positioned rearward of a plane defined by a rearward surface of the exhaust outlet. The plurality of components of the E-PTO system include an electric motor electrically coupled to the battery and a hydraulic pump. The electric motor is configured to be driven by electrical energy provided by the battery to drive the hydraulic pump to provide pressurized hydraulic fluid to an accessory of the refuse vehicle.

Another embodiment relates to a refuse vehicle. The refuse vehicle includes a chassis; a body assembly coupled to the chassis; a cab coupled to the chassis forward of the body assembly; a prime mover coupled to at least one of the chassis or the body assembly; an exhaust outlet fluidly coupled to the prime mover; a battery configured to store electrical energy; and an electric power take-off ("E-PTO") system including a plurality of components positioned within a housing that is coupled to at least one of the body assembly or the cab. The exhaust outlet is configured to emit exhaust gas generated by the prime mover. A forward surface of the exhaust outlet defines a first plane. A rearward surface of the exhaust outlet defines a second plane. The housing is positioned outside of an exhaust region defined between the first plane and the second plane. The plurality of components of the E-PTO system include an electric motor electrically coupled to the battery and a hydraulic pump. The electric motor is configured to be driven by electrical energy provided by the battery to drive the hydraulic pump to provide pressurized hydraulic fluid to an accessory of the refuse vehicle.

Yet another embodiment relates to a refuse vehicle. The refuse vehicle includes a chassis; a body assembly coupled to the chassis; a battery configured to store electrical energy; and an electric power take-off ("E-PTO") system. The body assembly includes a body defining a refuse compartment configured to store refuse and a tailgate pivotably coupled to the body by a pivot connection. The tailgate is configured to pivot relative to the body between an open configuration and a closed configuration. The E-PTO system includes a plurality of components positioned within a housing that is coupled to the tailgate. The plurality of components of the E-PTO system include an electric motor electrically coupled to the battery and a hydraulic pump. The electric motor is configured to be driven by electrical energy provided by the battery to drive the hydraulic pump to provide pressurized hydraulic fluid to an accessory of the refuse vehicle.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Figure 1:
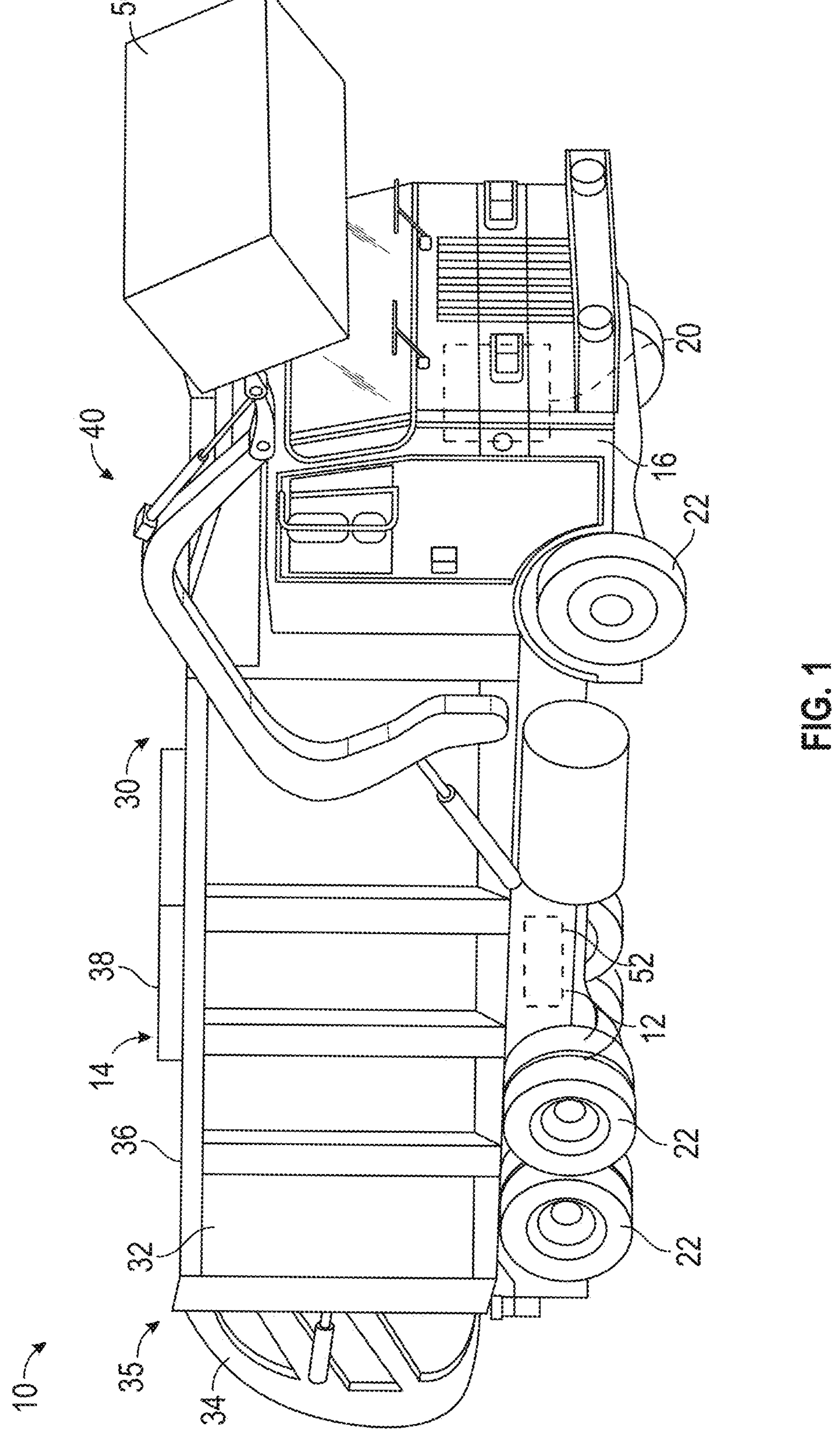
FIG. 1 is a perspective view of a refuse vehicle, according to an exemplary embodiment.

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Overview

Referring generally to the Figures, various embodiments of a hybrid refuse vehicle (e.g., including a combustion engine and electric energy storage device, etc.) are shown. The refuse vehicle includes a prime mover (e.g., an engine, a generator, etc.) configured to provide mechanical power to a motive member (e.g., a wheel, a track, a tread, etc.) to move the refuse vehicle. The prime mover may be configured as an internal combustion engine (e.g., an ICE, etc.) configured to combust (e.g., ignite, etc.) a fuel (e.g., gasoline, hydrogen, natural gas, etc.) in order to generate the mechanical power that is provided to the motive member. For example, the prime mover may be a gasoline internal combustion engine configured to combust gasoline (e.g., received from an onboard storage device, received from a gas tank, etc.) to generate the mechanical power that is provided to the motive member. Because the prime mover generates the mechanical power by combusting the fuel, the prime mover may produce exhaust gas (e.g., waste gas, emissions, exhaust, fumes, combustion byproducts, etc.) that needs to be discharged from the vehicle. The refuse vehicle may include an exhaust port (e.g., an exhaust outlet, etc.) that is configured to emit the exhaust gas produced by the prime mover. For example, the exhaust port may be fluidly coupled to the prime mover so that the exhaust port can receive the exhaust gas from the prime mover. A forward surface (e.g., a front surface, etc.) of the exhaust port may define a front plane. A rearward surface (e.g., a rear surface, etc.) of the exhaust port may define a rear plane. The exhaust port may be positioned between a body assembly and a cab of the refuse vehicle (e.g., when the prime mover is positioned in the cab of the refuse vehicle, etc.)

The hybrid refuse vehicle also includes a battery (e.g., a battery assembly, a battery cell, etc.) configured to provide electrical power to a system of the refuse vehicle to operate the system of the refuse vehicle. The battery can be used to provide power to different subsystems on the refuse vehicle. In some embodiments, the energy storage device is also configured to provide hydraulic power to different subsystems on the refuse vehicle through an electric power take-off (E-PTO) system. The E-PTO system receives electrical power from the energy storage device and provides the electrical power to an electric motor that drives a hydraulic pump, which provides pressurized hydraulic fluid to different vehicle subsystems, including the compactor and the lifting system.

The E-PTO system may be positioned within a modular housing that is removably coupled onto the body assembly of the refuse vehicle in various locations along the body assembly. For example, the E-PTO system may be fastened at a front end of the body assembly of the refuse vehicle and can define a compartment or enclosure within which the components of the E-PTO system can be positioned (e.g., batteries, an electric motor, an inverter, a hydraulic pump, etc.). In some embodiments, the E-PTO system is removable from the body assembly of the refuse vehicle (e.g., for servicing) and swappable or replaceable with a second modular E-PTO system that is structurally the same or similar. In this way, a shop or servicing location may include multiple modular E-PTO systems which can quickly be swapped onto refuse vehicles to reduce fleet downtime and improve efficiency of a refuse vehicle fleet.

Exposure of the E-PTO system to exhaust gases can cause various operational issues. For example, heat emitted by the exhaust port that is generated by the prime mover may affect the performance of the E-PTO system. For example, the heat emitted by the exhaust port may increase a temperature of the electric motor of the E-PTO system and decrease an efficiency of the electric motor. Additionally, the exhaust gas may be corrosive and may cause corrosion of conduits and/or cables of the E-PTO system. Such corrosion of the conduits of the E-PTO system may lead to the pressurized hydraulic fluid leaking from the E-PTO system.

Various embodiments of the present disclosure relate to an E-PTO system is structured and arranged to avoid adverse interactions with the exhaust system during operation of the refuse vehicle, without impacting system performance. For example, the modular housing may be coupled to the body assembly of the refuse vehicle at a position that is longitudinally offset from the exhaust port. In such arrangements, the modular housing may be coupled to the body assembly of the refuse vehicle at a location rearward of the exhaust port such that the E-PTO system is not positioned above the exhaust port. For example, the modular housing may be coupled to a tailgate of the body assembly of the refuse vehicle positioned on a rearward side of the refuse vehicle such that the modular housing, and thus the E-PTO system, are positioned away from the exhaust port. As another example, the modular housing may be coupled to a cover of a refuse compartment of the body assembly of the refuse vehicle positions on a top side of the refuse vehicle such that the modular housing, and thus the E-PTO system, are positioned away from the exhaust port. As another example, the modular housing may be coupled to a forward facing surface of the body assembly and rearward of the rear surface the exhaust port such that the modular housing, and thus the E-PTO system, are not positioned above the exhaust port.

Refuse Vehicle

Referring to FIG. 1, a vehicle, shown as refuse vehicle 10 (e.g., garbage truck, waste collection truck, sanitation truck, etc.), includes a chassis, shown as a frame 12; a body assembly, shown as body 14, coupled to the frame 12 (e.g., at a rear end thereof, etc.); and a cab 16, coupled to the frame 12 (e.g., at a front end thereof, etc.), according to some embodiments. In other embodiments, the vehicle is configured as a vocational vehicle other than the refuse vehicle 10. For example, the vehicle may be configured as a delivery truck, a dump truck, a tow truck, a fire truck, a concrete mixer, or any other type of vocational vehicle. The cab 16 may include various components to facilitate operation of refuse vehicle 10 by an operator (e.g., a seat, a steering wheel, hydraulic controls, a user interface, switches, buttons, dials, etc.). The cab 16 may also include components that can execute commands automatically to control different subsystems within the vehicle (e.g., computers, controllers, processors, etc.). The refuse vehicle 10 further includes a prime mover 20 coupled to the frame 12 at a position beneath the cab 16. The prime mover 20 provides power to a plurality of motive members (e.g., tractive elements, etc.), shown as wheels 22, and to other systems of the vehicle (e.g., a pneumatic system, a hydraulic system, an electric system, etc.). A pair of wheels 22 may be coupled to an axle. The refuse vehicle 10 may include at least two axles. In some embodiments, the refuse vehicle 10 may include at least four axles, and may include five axles in various embodiments herein.

The prime mover 20 may be configured to use a variety of fuels (e.g., gasoline, diesel, biodiesel, ethanol, natural gas, compressed natural gas, hydrogen, fuel gas, etc.), according to various exemplary embodiments. According to an alternative embodiment, the prime mover 20 includes one or more electric motors coupled to the frame 12. The electric motors may consume electrical power from an on-board storage device (e.g., batteries, ultra-capacitors, hydrogen cells, etc.), from an on-board generator (e.g., an internal combustion engine, high efficiency solar panels, regenerative braking system, etc.), or from an external power source (e.g., overhead power lines) and provide power to the systems of the refuse vehicle 10. According to some embodiments, the refuse vehicle 10 may be in other configurations than shown in FIG. 1.

According to an exemplary embodiment, the refuse vehicle 10 is configured to transport refuse from various waste refuse containers within a municipality to a storage or processing facility (e.g., a landfill, an incineration facility, a recycling facility, etc.). The body 14 includes an on-board refuse container. In the embodiment of FIG. 1, the body 14 and on-board refuse container, in particular, defines a refuse compartment 30. In some embodiments, the body 14 includes a plurality of panels, shown as panels 32, a tailgate 34, and a cover 36 (e.g., a roof portion, etc.) that together define the refuse compartment 30. For example, the cover 36 may define a top portion of the refuse compartment 30. Loose refuse may be placed into the refuse compartment 30 where it may thereafter be compacted (e.g., by a packer system, etc.). The refuse compartment 30 may provide temporary storage for refuse during transport to a waste disposal site and/or a recycling facility. In some embodiments, at least a portion of the body 14 and the refuse compartment 30 extend above or in front of the cab 16. According to the embodiment shown in FIG. 1, the body 14 and the refuse compartment 30 are positioned behind the cab 16.

In some embodiments, the refuse compartment 30 includes a hopper volume and a storage volume. Refuse may be initially loaded into the hopper volume and thereafter compacted into the storage volume. According to an exemplary embodiment, the hopper volume is positioned between the storage volume and the cab 16 (e.g., refuse is loaded into a position of the refuse compartment 30 behind the cab 16 and stored in a position further toward the rear of the refuse compartment 30). In such arrangements, the refuse vehicle 10 may be a front-loading refuse vehicle or a side-loading refuse vehicle. In other embodiments, the storage volume is positioned between the hopper volume and the cab 16. In such embodiments, the refuse vehicle 10 may be a rear-loading refuse vehicle in which refuse is loaded into the vehicle through a tailgate 34 or rear end of the vehicle.

The body 14 further includes a tailgate 34 which is movably (e.g., rotatably, etc.) coupled to the on-board refuse container and is positioned at the rear end of the body 14. The tailgate 34 is configured to pivot about pivot pins of a pivot assembly 35 positioned along the top surface of the on-board refuse container. In other embodiments, a different connection mechanism may be used to support the tailgate 34 on the body 14.

As shown in FIG. 1, the refuse vehicle 10 includes a lift mechanism/system (e.g., a front-loading lift assembly, etc.), shown as lift assembly 40, coupled to the front end of the body 14. In other embodiments, the lift assembly 40 extends rearward of the body 14 (e.g., a rear-loading refuse vehicle, etc.). In still other embodiments, the lift assembly 40 extends from a side of the body 14 (e.g., a side-loading refuse vehicle, etc.). As shown in FIG. 1, the lift assembly 40 is configured to engage a container (e.g., a residential trash receptacle, a commercial trash receptacle, a container having a robotic grabber arm, etc.), shown as refuse container 50. The lift assembly 40 may include various actuators (e.g., electric actuators, hydraulic actuators, pneumatic actuators, etc.) to facilitate engaging the refuse container 50, lifting the refuse container 50, and tipping refuse out of the refuse container 50 into the hopper volume of the refuse compartment 30 through an opening in the cover 36 or through the tailgate 34. The lift assembly 40 may thereafter return the empty refuse container 50 to the ground. According to an exemplary embodiment, a door, shown as top door 38, is movably coupled along the cover 36 to seal the opening thereby preventing refuse from escaping the refuse compartment 30 (e.g., due to wind, bumps in the road, etc.).

Figure 2:
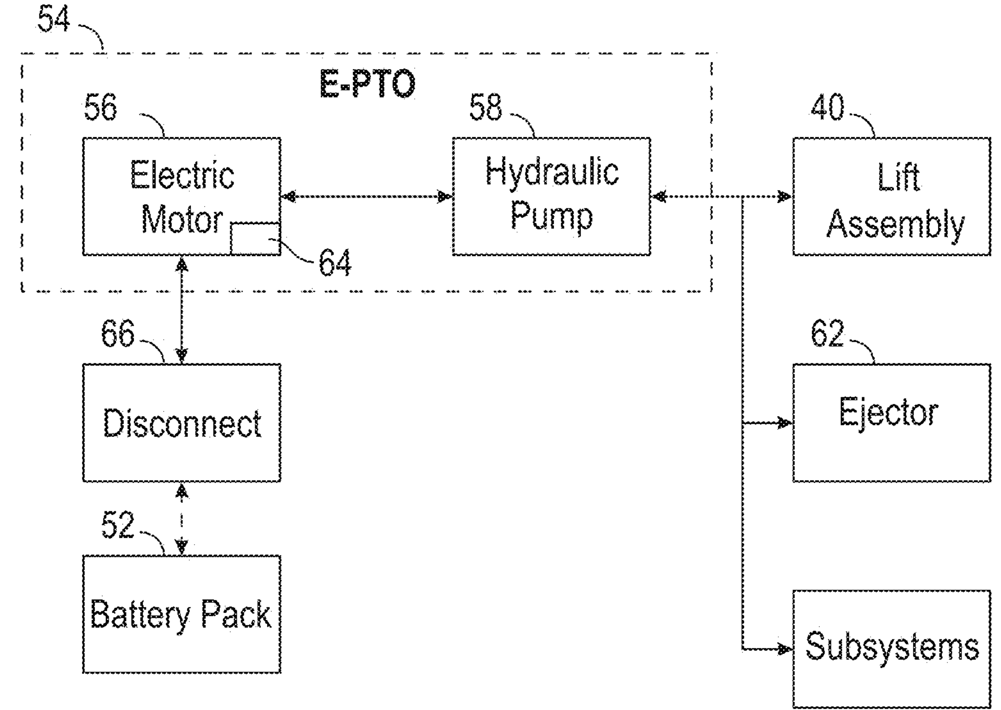
FIG. 2 is a block diagram of an electric power take-off system of the refuse vehicle of FIG. 1 according to an exemplary embodiment.
Figure 3:
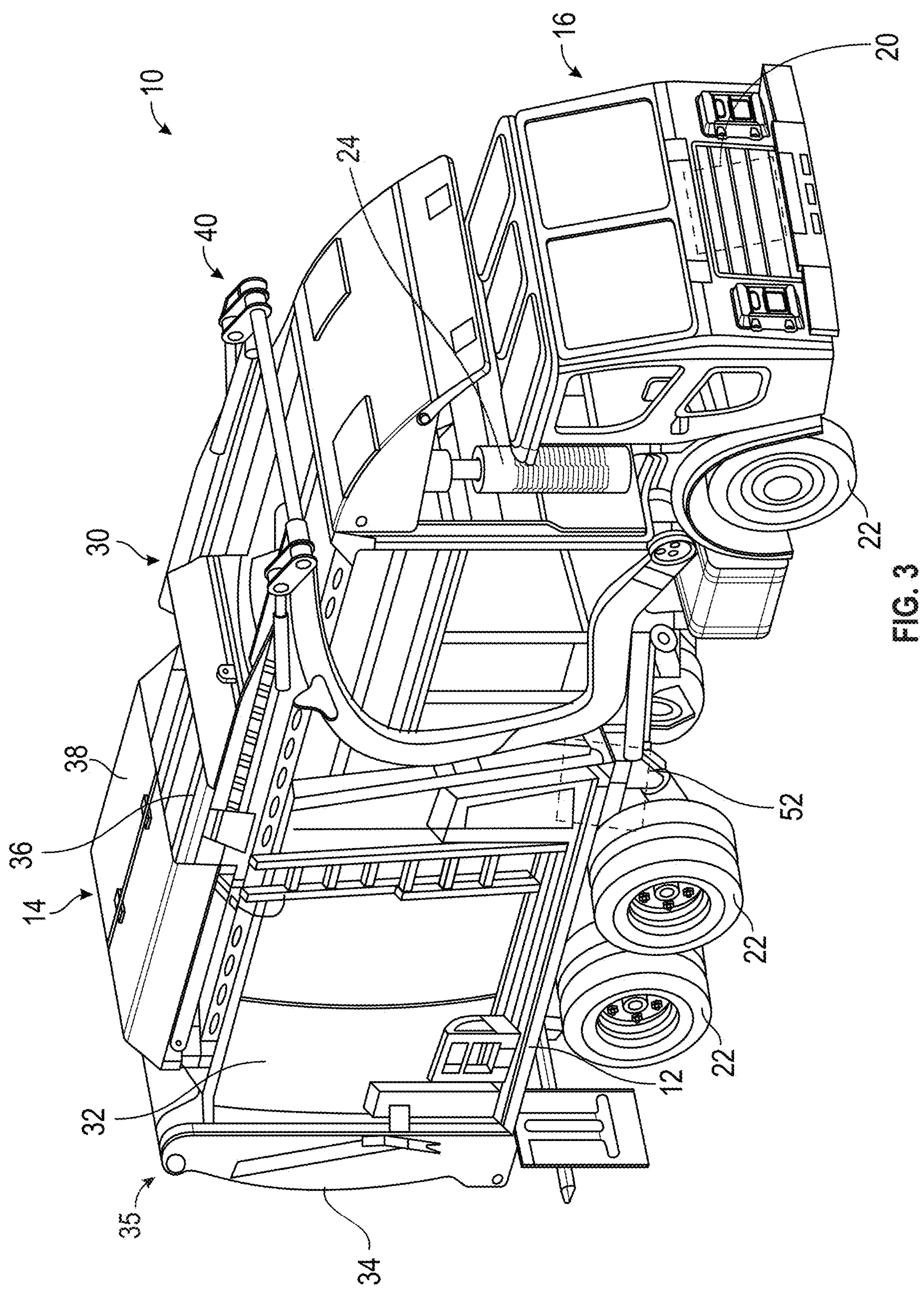
FIG. 3 is a perspective view of another refuse vehicle, according to an exemplary embodiment.

Referring to FIG. 2, in embodiments in which the refuse vehicle 10 is an electric refuse vehicle (e.g., an E-refuse vehicle, etc.) or a hybrid refuse vehicle (e.g., a vehicle including both electric and non-electric power systems, etc.), the refuse vehicle may further include an onboard energy storage device. In some embodiments, the onboard energy storage device includes a battery 52 that provides power to a motor that produces rotational power to drive the refuse vehicle. The energy storage device can be used to provide power to different subsystems on the refuse vehicle. The refuse vehicle may also include an electric power take-off (E-PTO) system, shown as E-PTO system 54, that is configured to receive electrical power from the battery 52 and/or other power sources and to convert the electrical power to hydraulic power for different subsystems on the refuse vehicle 10. In some embodiments, the E-PTO system 54 receives electrical power from the energy storage device and provides the electrical power to an electric motor 56. For example, the electric motor 56 may be driven by the electrical power provided by the energy storage device. In such embodiments, the electric motor 56 may drive a hydraulic pump 58 that provides pressurized hydraulic fluid to different vehicle subsystems (e.g., accessories, at least one accessory, etc.), such as the lift assembly 40, the packer/ejector, shown as ejector 62, or other subsystems (e.g., the tailgate, etc.).

The E-PTO system may include an E-PTO controller 64. The E-PTO controller 64 may monitor various systems within the refuse vehicle, including the E-PTO system 54. The E-PTO controller 64 may receive data from sensors (not shown) within the system, compare the data to expected values under normal operating conditions, adjust the operation parameters of components of the system, and determine if a critical operating condition exists based on the sensor data. Further, the E-PTO controller 64 may shut down the system and/or the refuse vehicle in response to detecting a critical operating condition. In some embodiments, the refuse vehicle further includes a disconnect 66 positioned between the battery 52 and the E-PTO system 54 to allow different vehicle subsystems (e.g., the ejector 62, the lift assembly 40, etc.) to be decoupled and de-energized from the electrical power source. For example, the E-PTO controller 64 may cause the disconnect 66 to be decoupled and de-energized from the electrical power source.

The disconnect 66 further allows an all-electric vehicle chassis to be retrofit with hydraulic power systems, which can be advantageous for a variety of reasons, as hydraulic power systems may be more responsive and durable than fully electric systems. In some embodiments, the E-PTO system 54 includes a secondary battery that is configured to supply electrical power to the E-PTO system 54 if the disconnect 66 is tripped, such that the secondary vehicle systems can remain optional even when the E-PTO system 54 is not receiving electrical power from the batteries 52. In some examples, the E-PTO system 54 operates independently of the battery 52, and includes the secondary battery that is dedicated to the E-PTO system 54 that supplies electrical power to the electric motor 56. With the secondary battery present within the E-PTO system 54, the E-PTO system can be agnostic to the chassis type, and can be incorporated into all-electric, hybrid, diesel, CNG, or other suitable chassis types.

Hybrid Refuse Vehicle

Referring to FIGS. 3, 8, and 13-15, the refuse vehicle 10 is configured as a hybrid refuse vehicle that includes both electric and non-electric power systems. In some embodiments, the refuse vehicle 10 includes (i) the E-PTO system 54 configured to receive the electrical power from the battery 52 and convert the electric power to hydraulic power for different subsystems on the refuse vehicle 10 and (ii) the prime mover 20 configured to combust one of the variety of fuels to provide power to the wheels 22 to drive the refuse vehicle 10. For example, the E-PTO system 54 may generate hydraulic power to operate the tailgate 34, the lift assembly 40, and other systems of the refuse vehicle 10 and the prime mover 20 may be an internal combustion engine ("ICE") configured to receive gasoline from one of the on-board storage devices configured as a gasoline tank to generate the power used to drive the refuse vehicle 10. In some embodiments, the power generated by the prime mover 20 may be converted to electric power (e.g., by the on-board generator, etc.) and provided to the battery 52 such that the electric power received by the E-PTO system 54 is generated using the power generated by the prime mover 20. In some embodiments, the battery 52 may be configured to be charged with electric power by an external charging system (e.g., a charging station, etc.).

When the prime mover 20 configured as the internal combustion generator generates power, the combustion of the fuel in the prime mover 20 may produce exhaust gas (e.g., waste gas, exhaust, emissions, fumes, combustion byproducts, etc.). The refuse vehicle 10 may include an exhaust outlet 24 (e.g., an exhaust pipe, an exhaust port, etc.) configured to emit the exhaust gas produced by the prime mover 20 to the surroundings of the refuse vehicle 10. For example, the exhaust outlet 24 may be fluidly coupled to a portion of the prime mover 20 that produces the exhaust gas such that the exhaust outlet 24 may receive the exhaust gas from the prime mover 20 and emit the exhaust gas to the surroundings of the refuse vehicle 10. The exhaust outlet 24 may include elements configured to process the exhaust gas received from the prime mover 20 prior to emitting the exhaust gas to the surroundings of the refuse vehicle 10. For example, the exhaust outlet 24 may include a catalytic converter configured to convert harmful pollutants in the exhaust gas into less harmful substances through catalytic reactions. In some embodiments, the exhaust outlet 24 includes elements configured to reduce a noise produced by the prime mover 20 during the combustion of the fuel. For example, the exhaust outlet 24 may include a resonator configured to cancel out certain frequencies of noise produced by the prime mover 20 and/or a muffler configured to absorb and/or dissipate a portion of the noise produced by the prime mover 20.

As shown in FIGS. 3, 8, and 13-15, the prime mover 20 and the exhaust outlet 24 are positioned on the cab 16 of the refuse vehicle 10, according to some embodiments. For example, the prime mover 20 may be positioned in a lower portion of the cab 16 (e.g., below a cab section configured to receive an operator of the refuse vehicle 10, etc.) and the exhaust outlet 24 is coupled to a rear surface of the cab 16. When the prime mover 20 and the exhaust outlet 24 are both positioned on the cab 16, conduits connecting the prime mover 20 and the exhaust outlet 24 to provide the exhaust gas from the prime mover 20 to the exhaust outlet 24 may be fixed conduits since the exhaust outlet 24 will not move relative to the prime mover 20. In other embodiments, the prime mover 20 and the exhaust outlet 24 are positioned on the body 14 and/or the frame 12 of the refuse vehicle 10. In still other embodiments, one of the prime mover 20 or the exhaust outlet 24 is positioned on the cab 16 and the other of the prime mover 20 or the exhaust outlet 24 is positioned on the body 14 and/or the frame 12 of the refuse vehicle 10. When the prime mover 20 and the exhaust outlet 24 are not both positioned on the cab 16 or the body 14, the conduits connecting the prime mover 20 and the exhaust outlet 24 may have a flexible portion since the exhaust outlet 24 may move relative to the prime mover 20. For example, the cab 16 may be pivotably coupled to the body 14 and/or the frame 12 such that the prime mover 20 may move relative to the exhaust outlet 24 when the prime mover 20 and the exhaust outlet 24 are not both positioned on the cab 16 or the body 14.

Figure 8:
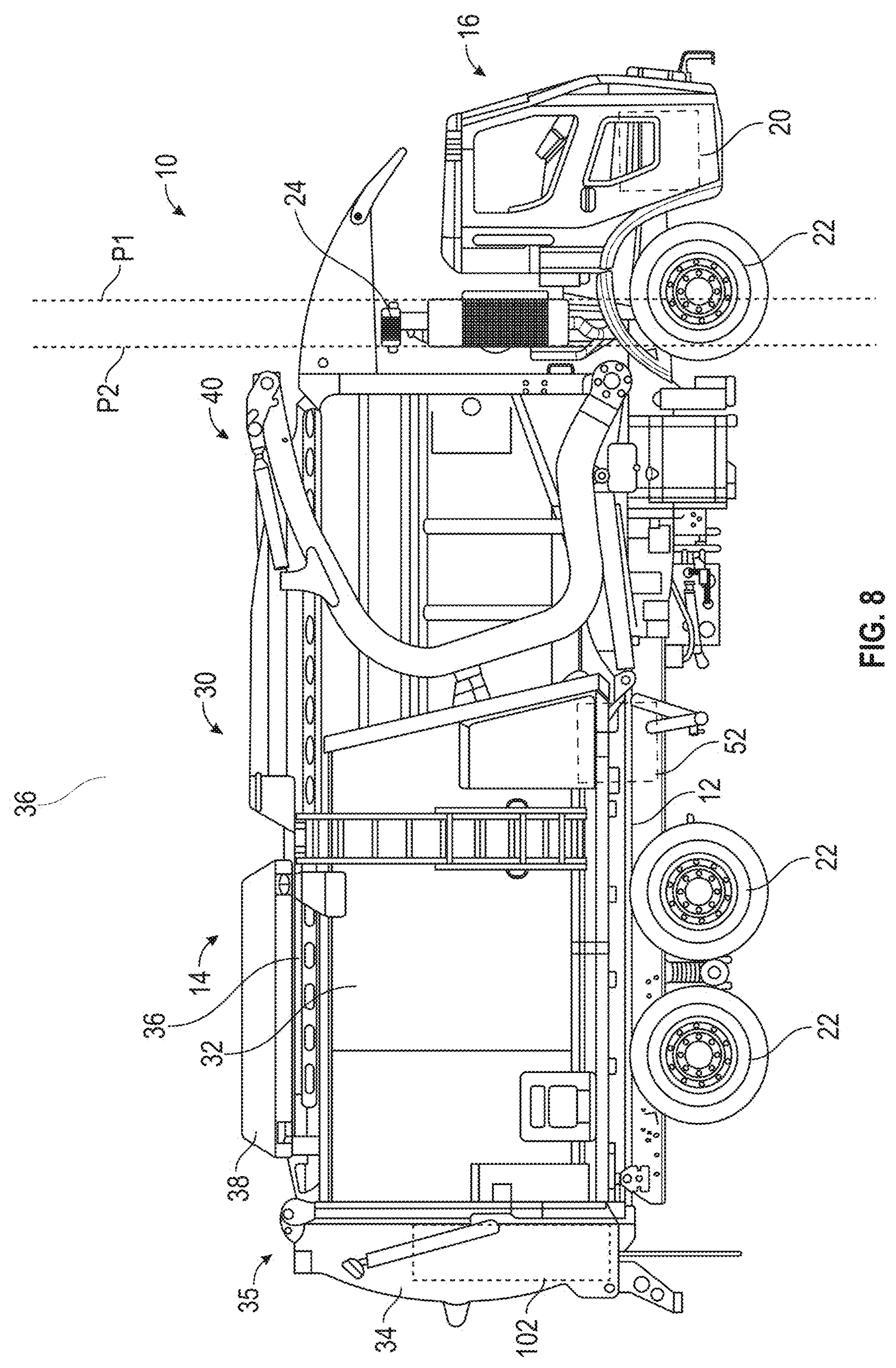
FIG. 8 is a side view of the refuse vehicle of FIG. 3 with the E-PTO module of FIG. 4 in a first position, according to an embodiment.
Figure 13:
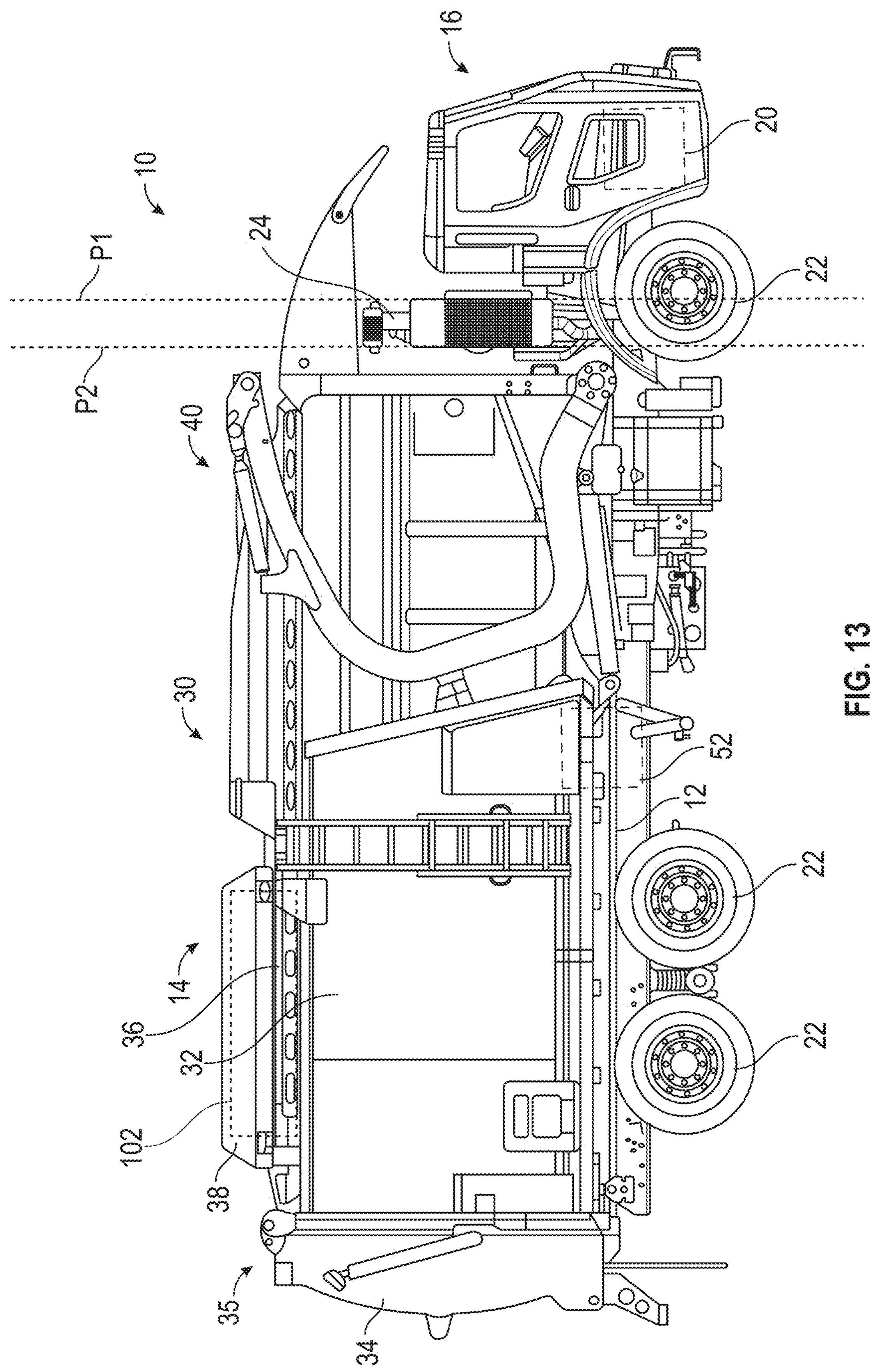
FIG. 13 is a side view of the refuse vehicle of FIG. 3 with the E-PTO module of FIG. 4 in a second position, according to an embodiment.
Figure 14:
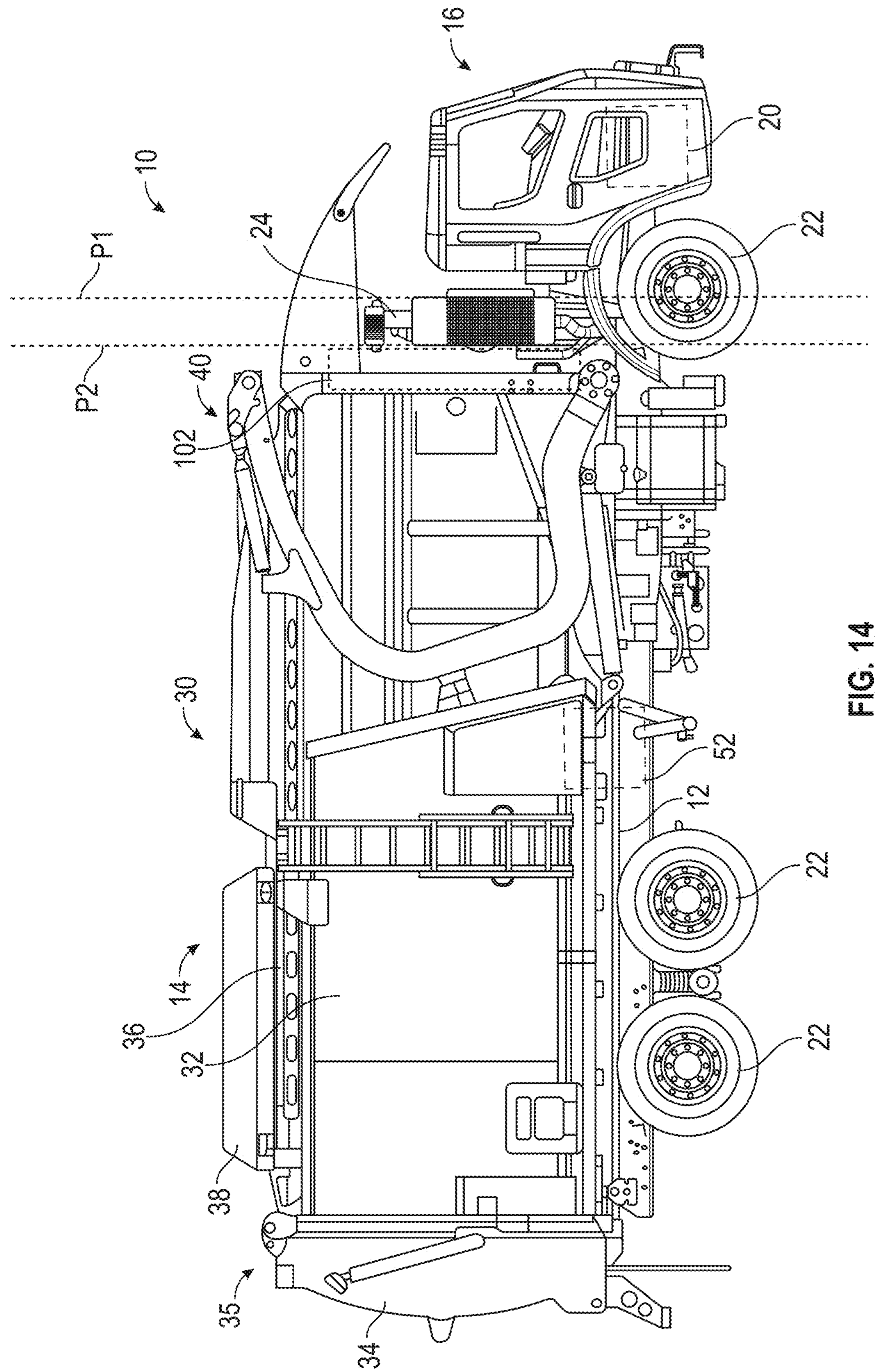
FIG. 14 is a side view of the refuse vehicle of FIG. 3 with the E-PTO module of FIG. 4 in a third position, according to an embodiment.

As shown in FIGS. 8, 13, and 14, a forward surface (e.g., a forwardmost, etc.) of the exhaust outlet 24 defines a first plane (e.g., a plane, etc.), shown as front plane P1, according to some embodiments. The forward surface of the exhaust outlet 24 may be a forwardmost surface of the exhaust outlet 24 in a direction of travel of the refuse vehicle 10 and the front plane P1 may be orientated perpendicular to the direction of travel of the refuse vehicle.

As shown in FIGS. 8, 13, and 14, a rearward surface (e.g., a rearward most, etc.) of the exhaust outlet 24 defines a second plane, shown as rear plane P2, according to some embodiments. The rearward surface of the exhaust outlet 24 may be a rearward most surface of the exhaust outlet 24 in a direction of travel of the refuse vehicle 10 and the rear plane P2 may be orientated perpendicular to the direction of travel of the refuse vehicle. The front plane P1 and the rear plane P2 may be parallel. The front plane P1 and the rear plane P2 may define an exhaust region positioned between the front plane P1 and the rear plane P2. For example, the exhaust region may extend rearward from the front plane P1 to the rear plane P2. The exhaust region may represent a region that receives the exhaust emitted by the exhaust outlet 24.

Modular Electric Power Take-Off

Figure 4:
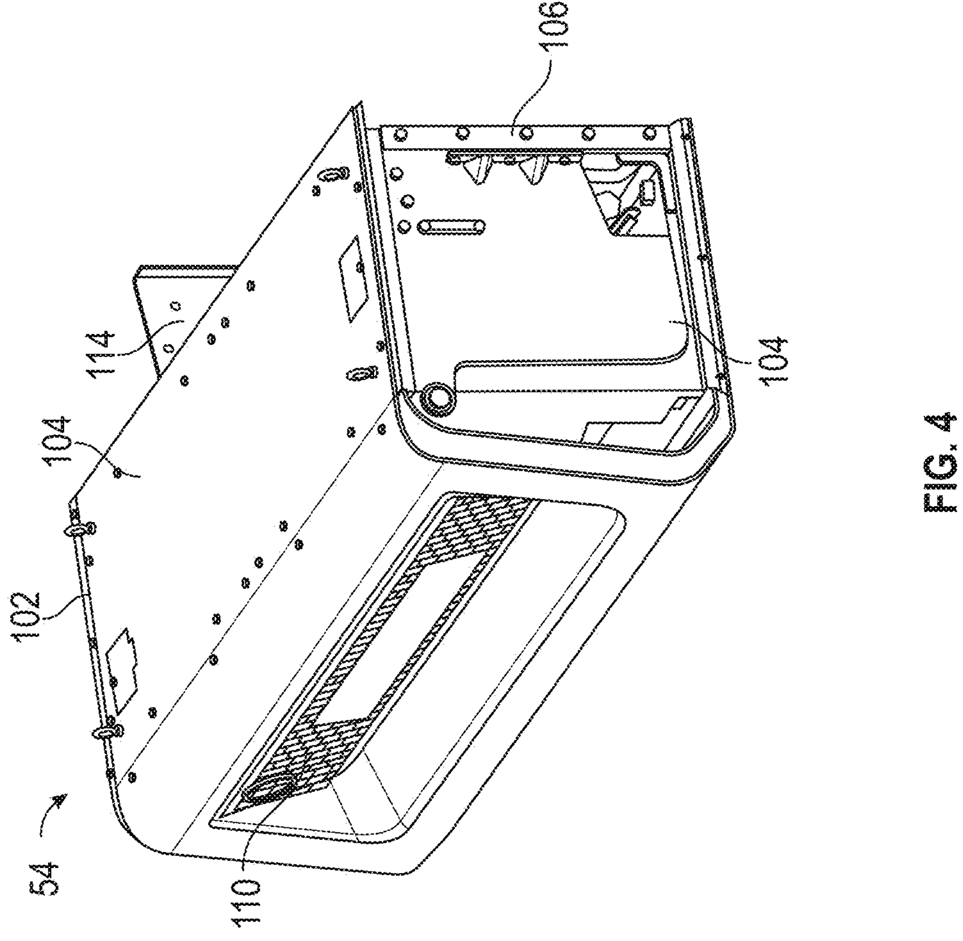
FIG. 4 is a perspective view of an electric power take-off ("E-PTO") module of the refuse vehicle of FIG. 1 or FIG. 3, according to an exemplary embodiment.
Figure 5:
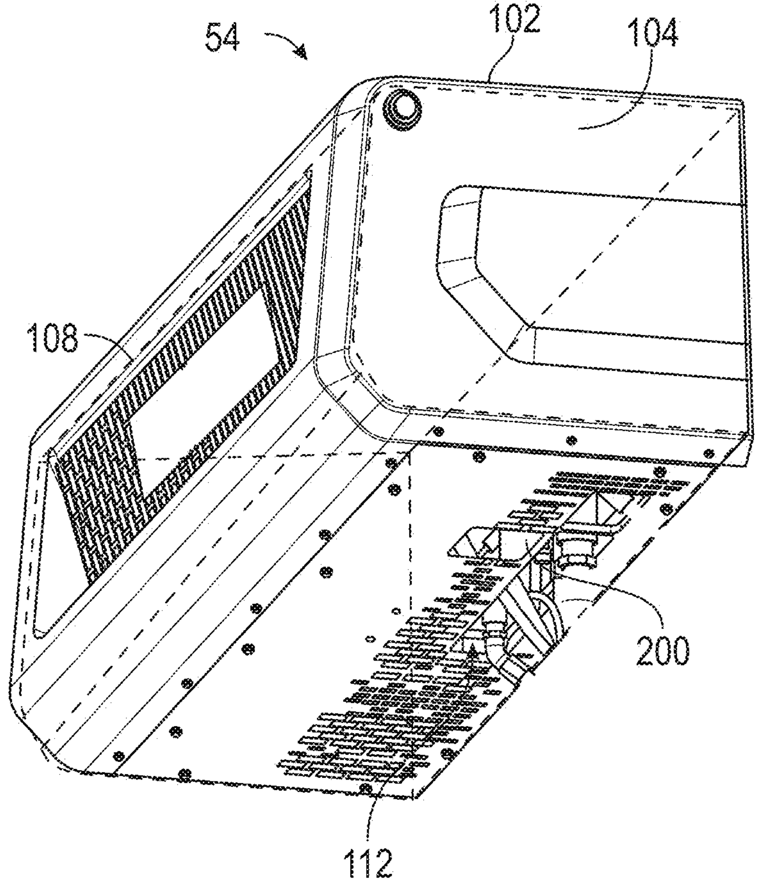
FIG. 5 is another perspective view of the E-PTO module of FIG. 4, according to an exemplary embodiment.

Referring to FIGS. 4 and 5, the E-PTO system 54 or the various components thereof may be physically provided on the refuse vehicle 10 in a modular housing 102 (e.g., a pod, a body, a capsule, a physically detachable assembly, an integral unit, a kit, etc.), according to some embodiments. For example, a plurality of components of the E-PTO system 54 may be positioned within the modular housing 102. The modular housing 102 may include one or more housing panels 104 (e.g., housing members, planar surfaces, plates, etc.) and one or more structural members 106 (e.g., support members, bars, beams, rails, etc.) onto which the housing panels 104 are coupled (e.g., fastened, attached, welded, etc.).

The housing panels 104 may define an inner volume 108 (e.g., a space, an area, a zone, a compartment, etc.) within which one or more of the components of the E-PTO system 54 are positioned. In some embodiments, the E-PTO controller 64 and the secondary battery are positioned within the inner volume 108 of the modular housing 102. The modular housing 102 may include one or more sidewalls, that form or include a grating 110 (e.g., a mesh, an array of openings, multiple holes, etc.) to facilitate heat dissipation out of the modular housing 102 (e.g., heat that is generated by the battery 52). The grating 110 may be positioned in a direction of travel of the refuse vehicle 10 such that movement of the refuse vehicle 10 induces the transportation of air into the inner volume 108 of the modular housing 102 to thereby provide cooling for components of the E-PTO system 54. In some embodiments, the grating 110 is positioned directly in front of a radiator of the E-PTO system 54.

The modular housing 102 can include one or more openings 112 so that one or more tubular members (e.g. hoses, hydraulic lines, etc.) and one or more cables (e.g., electrical cables, energy carrying cables, communications wires, etc.) can be coupled or connected to the corresponding components within the modular housing 102 (e.g., to electrically and/or hydraulically couple the compartment to the frame 12 and/or other components of the refuse vehicle 10). For example, the cables may include high voltage (HV) and low voltage (LV) cables that electrically couple the electric motor 56 with the batteries 52 or with a controller of the refuse vehicle 10. In some embodiments, the modular housing 102 is also configured to receive a hydraulic hose through the opening 112 so that the various hydraulic components of the refuse vehicle 10 (e.g., the lift assembly 40, the tailgate 34, etc.) may be hydraulically coupled with the hydraulic pump 58 that is positioned within the modular housing 102. The opening 112 may be an elongated slot disposed on a lower wall of the modular housing 102 facing toward the frame 12 of the refuse vehicle 10 or another location along the modular housing 102. In some embodiments, the connection points for the cables (e.g., the electrical cables) and the hydraulic lines are in proximity to each other at the modular housing 102 such that the cables and hydraulic lines can easily be connected or disconnected from a single position when installing or removing the modular housing 102. In some embodiments, the cables include a disconnect (e.g., a plug) at a position between the modular housing 102 and the body 14 or frame 12 of the refuse vehicle 10, such as proximate to the opening 112 of the modular housing 102.

Referring still to FIGS. 4 and 5, the modular housing 102 may be coupled with the body 14 or the cab 16 via one or more connection members 114. The connection members 114 (e.g., plates, planar surfaces, structural members, engagement members, etc.) may define one or more surfaces at opposite lateral ends of the modular housing 102. In some embodiments, the modular housing 102 may be positioned between the connection members 114 and fastened to the connection members 114 via bolts or another suitable fastener. In some embodiments, the modular housing 102 is configured to interlock with corresponding portions of the body 14 or the connection members 114. For example, the modular housing 102 may include at least one quick disconnect such as clips, slotted openings (that support the modular housing 102 by its own weight on the frame 12), quick release pins, and/or another type of quick disconnect to simplify removal of the modular housing 102 from the body 14.

In some embodiments, the modular housing 102 is disposed on rails that extend from the body 14 (e.g., the connection members 114 include rails) and the modular housing 102 rests upon the rails. In some embodiments, the modular housing 102 is disposed in a drawer assembly and includes quick connects/disconnects for the electric cables and the hydraulic lines. In some embodiments, the body 14 includes a pan or a shelf that extends outwards from the body 14 (e.g., at a front end of the body 14, at a rear end of the body 14, on top of the body 14, from lateral sides of the body 14, etc.) and the modular housing 102 rests upon and is interlocked or fastened to the pan or the shelf. In still other embodiments, the modular housing 102 may be positioned on the frame 12, between frame rails of the frame 12, hung from the frame 12, positioned on a shelf that extends laterally from sides of the frame 12, etc. In some embodiments, the modular housing 102 is positioned within an inner volume of the body 14, on the tailgate 34, above the tailgate 34, below the tailgate 34, beneath the cab 16, etc.

Junction Box

Figure 6:
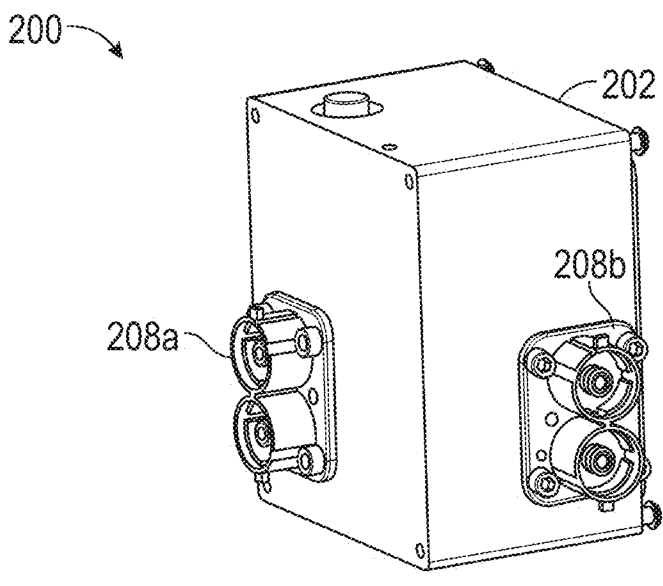
FIG. 6 is a perspective view of a junction box of the refuse vehicle of FIG. 1 or FIG. 3, according to an exemplary embodiment.

Referring particularly to FIG. 6, the E-PTO system 54 may include a junction box 200 that is coupled onto the modular housing 102 proximate a connection of the HV cables. In some embodiments, the junction box 200 facilitate safe and rapid disconnection or connection (e.g., electrical coupling or decoupling) of the HV cables such that components within the modular housing 102 can be electrically coupled with other HV components of the refuse vehicle 10 (e.g., to receive HV power or electrical energy). Advantageously, the junction box 200 may provide a single point for electrical connection between the HV components of the E-PTO system 54 and the HV components of the refuse vehicle 10, without requiring a technician to run wires to HV components of the E-PTO system 54 or disassemble portions of the modular housing 102.

Figure 7:
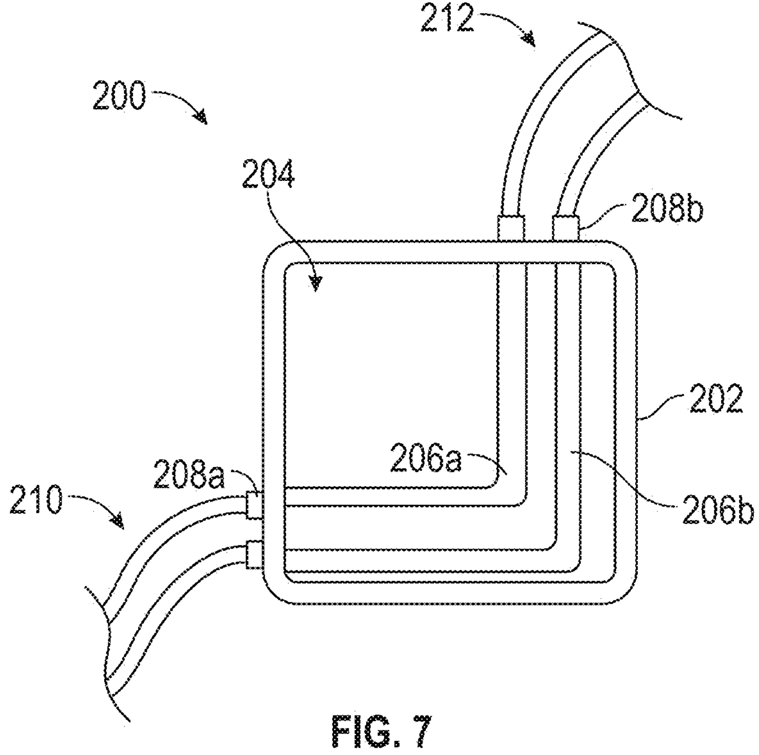
FIG. 7 is a section view of the junction box of FIG. 6, according to an exemplary embodiment.

Referring particularly to FIGS. 6 and 7, the junction box 200 may include a housing 202 that defines a housing inner volume 204 within which HV cables 206 (e.g., HV cables **206*a* and 206*b*) are positioned. The HV cables 206 may form a 90 degree turn within the housing 202. In some embodiments, the HV cables 206 that are within the junction box 200 electrically couple with a first connector 208*a* and a second connector 208*b*. The first connector 208*a* and the second connector 208*b* are formed within sidewalls of the housing 202 and are configured to provide connection points for HV cables of the refuse vehicle 10 and HV cables of the E-PTO system 54. In some embodiments, the first connector 208*a* and the second connector 208*b* are sealed connectors that seal with an exterior surface of HV cables (e.g., input HV cables 212 that are routed into the modular housing 102 or output HV cables 210 that are routed to and electrically couple with an HV system of the refuse vehicle 10). In some embodiments, both the first connector 208*a* and the second connector 208*b* are insulated HV connectors. Advantageously, the junction box 200 may provide a space (e.g., the housing inner volume 204) within which a sub-assembly can be installed without removing components of the E-PTO system 54 to access internal HV connection points. The junction box 200 may be positioned and accessible from an exterior of the modular housing 102. The junction box 200 may be positioned within the inner volume 108 of the modular housing 102 (and accessible to an operator via the opening 112) or may be positioned externally to the modular housing 102**.

Modular Housing Positioning

As shown in FIG. 8, the modular housing 102 containing the E-PTO system 54 may be coupled to the tailgate 34 of the body 14, according to some embodiments. For example, the modular housing 102 may be positioned within the tailgate 34. The modular housing 102 may be configured to move with the tailgate 34 when the tailgate 34 is moved relative to the refuse compartment 30 of the refuse vehicle 10. For example, the modular housing 102 may pivot relative to the refuse compartment 30 of the refuse vehicle 10 with the tailgate 34. In some embodiments, the modular housing 102 may be coupled to a rear surface of the tailgate 34. For example, the modular housing 102 may extend backward from the rear surface of the tailgate 34 relative to the direction of travel of the refuse vehicle 10. As another example, the modular housing 102 may be sub flush with the rear surface of the tailgate 34.

As shown in FIG. 8, when the modular housing 102 is coupled to the tailgate 34, the modular housing 102, and thus the E-PTO system 54, is positioned outside of the exhaust region defined by the front plane P1 and the rear plane P2 defined by the exhaust outlet 24 such that an effect of the heat and/or the exhaust gas emitted by the exhaust outlet 24 on the E-PTO system 54 is minimized. For example, the modular housing 102, and thus the E-PTO system 54 may be positioned rearward of the rear plane P2 defined by the exhaust outlet 24 such that an effect of the heat and/or the exhaust gas emitted by the exhaust outlet 24 on the E-PTO system 54 is minimized. The modular housing 102 may be coupled to tailgate 34 to position the E-PTO system 54 away from the exhaust outlet 24 such that heat and/or exhaust gas emitted by the exhaust outlet 24 does not impact the functionality of the E-PTO system 54. For example, if the E-PTO system 54 is positioned near the exhaust outlet 24, the heat from the exhaust outlet 24 may affect the performance of the electric motor 56 by heating the electric motor 56 and decreasing an efficiency of the electric motor 56. As another example, if the E-PTO system 54 is positioned near the exhaust outlet 24, the exhaust gas emitted by the exhaust outlet 24 may be corrosive and may corrode the conduits and/or cables of the E-PTO system 54.

As shown in FIGS. 9-12, the refuse vehicle 10 includes an electric cable 70 (e.g., wire, etc.) electrically coupled to the E-PTO system 54 configured to provide electric power from the battery 52 to the E-PTO system 54, according to some embodiments. For example, the electric cable 70 may be electrically coupled between one of the input HV cables 212 and the battery 52 and configured to provide electric power from the battery 52 to the one of the input HV cables 212. In various embodiments, the refuse vehicle 10 includes a plurality of the electric cables 70 electrically coupled to the E-PTO system 54 configured to provide electric power from the battery 52 to the E-PTO system 54. For example, each of the electric cables 70 may be electrically coupled between one of the input HV cables 212 and the battery 52.

As shown in FIGS. 9-12, arrangements of the electric cable 70 between the E-PTO system 54 and the battery 52 is shown, according to some embodiments. The electric cable 70 is connected to the E-PTO system 54 coupled to the tailgate 34 rearward of the pivot assembly 35, runs past a pivot (e.g., a pivot pin, etc.) of the pivot assembly 35, and forwards toward the cab 16 until the electric cable 70 connects to the battery 52. The electric cable 70 may include a first cable portion 72 coupled to the tailgate 34, a second cable portion 74 extending past the pivot assembly 35, and a third cable portion 76 positioned forward of the pivot assembly 35, according to some embodiments. The first cable portion 72 and the third cable portion 76 may be hard cables (e.g., static lines, etc.). For example, the first cable portion 72 may remain static relative to the tailgate 34 when the tailgate 34 moves relative to the refuse compartment 30 and the third cable portion 76 may remain static relative to the refuse compartment 30 when the tailgate 34 moves relative to the compartment. The second cable portion 74 may be a flexible cable (e.g., a moveable line, a flex cable, a deformable cable, etc.) configured to move relative to the tailgate 34 and/or the refuse compartment 30 when the tailgate 34 moves relative to the refuse compartment 30 such that the electric cable 70 can continue to electrically couple the E-PTO system 54 and the battery 52 when the tailgate 34 is moved relative to refuse compartment 30.

Figure 9:
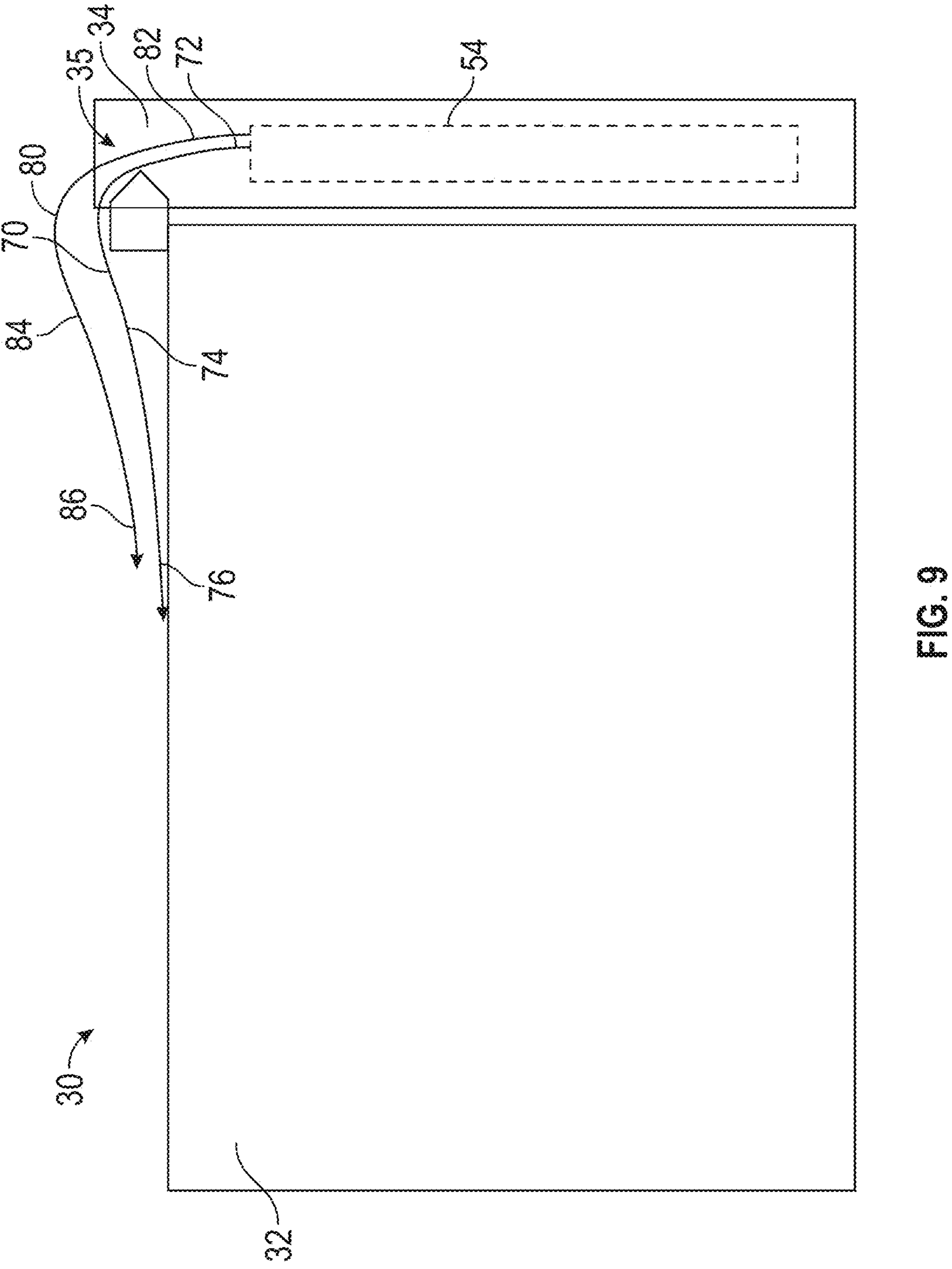
FIG. 9 is a side view of a portion of the refuse vehicle of FIG. 8 with cables and conduits in a first orientation, according to an embodiment.
Figure 10:
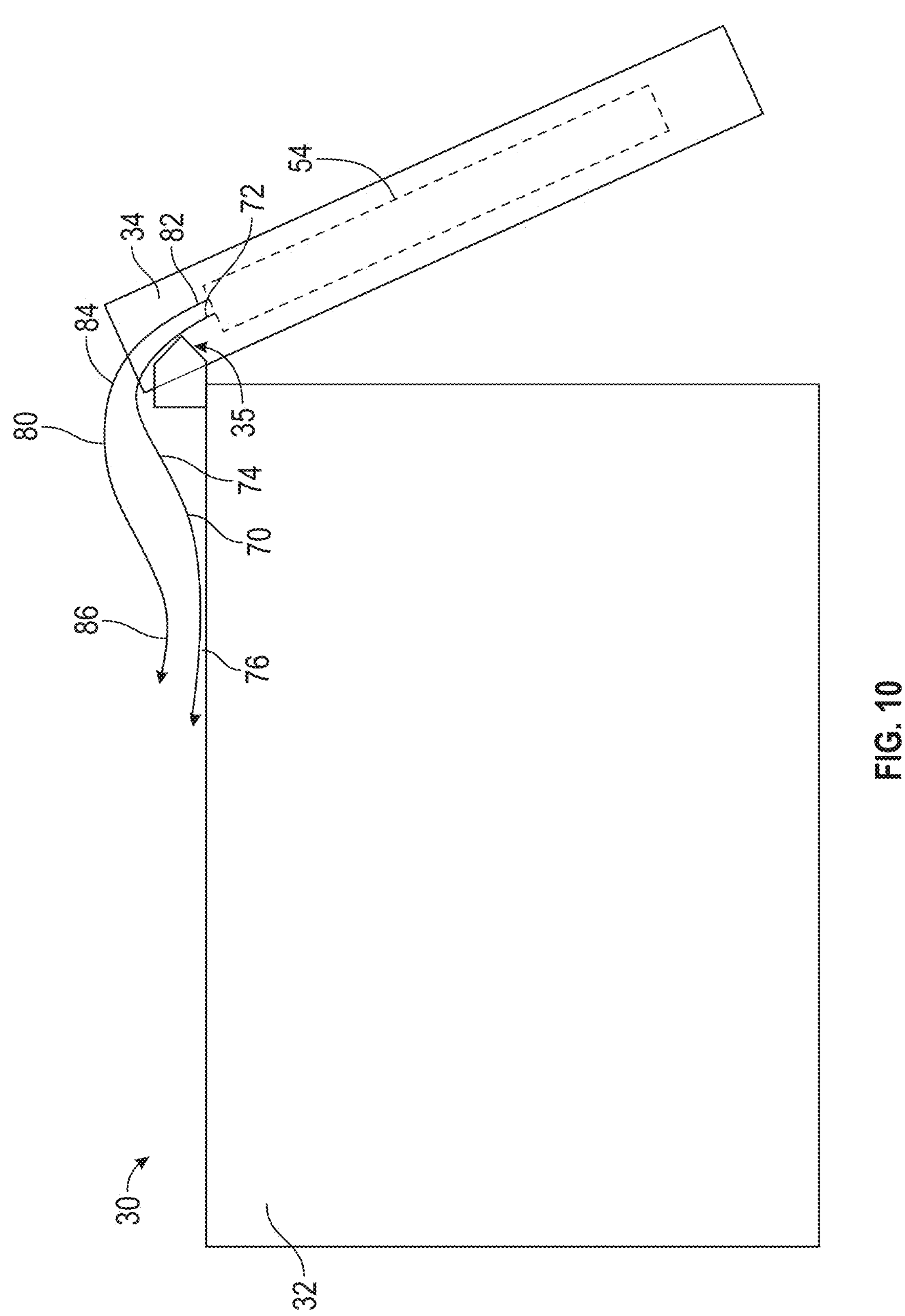
FIG. 10 is another side view of the portion of the refuse vehicle of FIG. 9 with cables and conduits in the first orientation, according to an embodiment.

As shown in FIGS. 9 and 10, the electric cable 70 runs around the pivot of the pivot assembly 35 from below, around the back of the pivot of the pivot assembly 35, and over a top of the pivot of the pivot assembly 35. Thus, in some embodiments, the electric cable 70 may include a 90-degree loop that extends from the tailgate 34, over the pivot of the pivot assembly 35, and onto the cover 36.

As shown in FIG. 10, the electric cable 70 is shown as arranged with reference to FIG. 9, with the tailgate 34 pivoted backwards relative to the refuse compartment 30. As shown, the electric cable 70 runs around the pivot of the pivot assembly 35 as suggested above with reference to FIG. 9 and is flexed (e.g., relative to the position of the electric cable 70 as suggested above with reference to FIG. 9, etc.) to extend onto the cover 36 and connect to the battery 52. Because the electric cable 70 runs around the pivot of the pivot assembly 35, the electric cable 70 does not "hang down" into a gap that is formed between the refuse compartment 30 and the tailgate 34 when the tailgate 34 is moved relative to the refuse compartment 30. In some embodiments, the second cable portion 74 of the electric cable 70 flexes to extend onto the cover 36 while the first cable portion 72 remains static relative to the tailgate 34 and the third cable portion 76 remains static relative to the refuse compartment 30.

Figure 11:
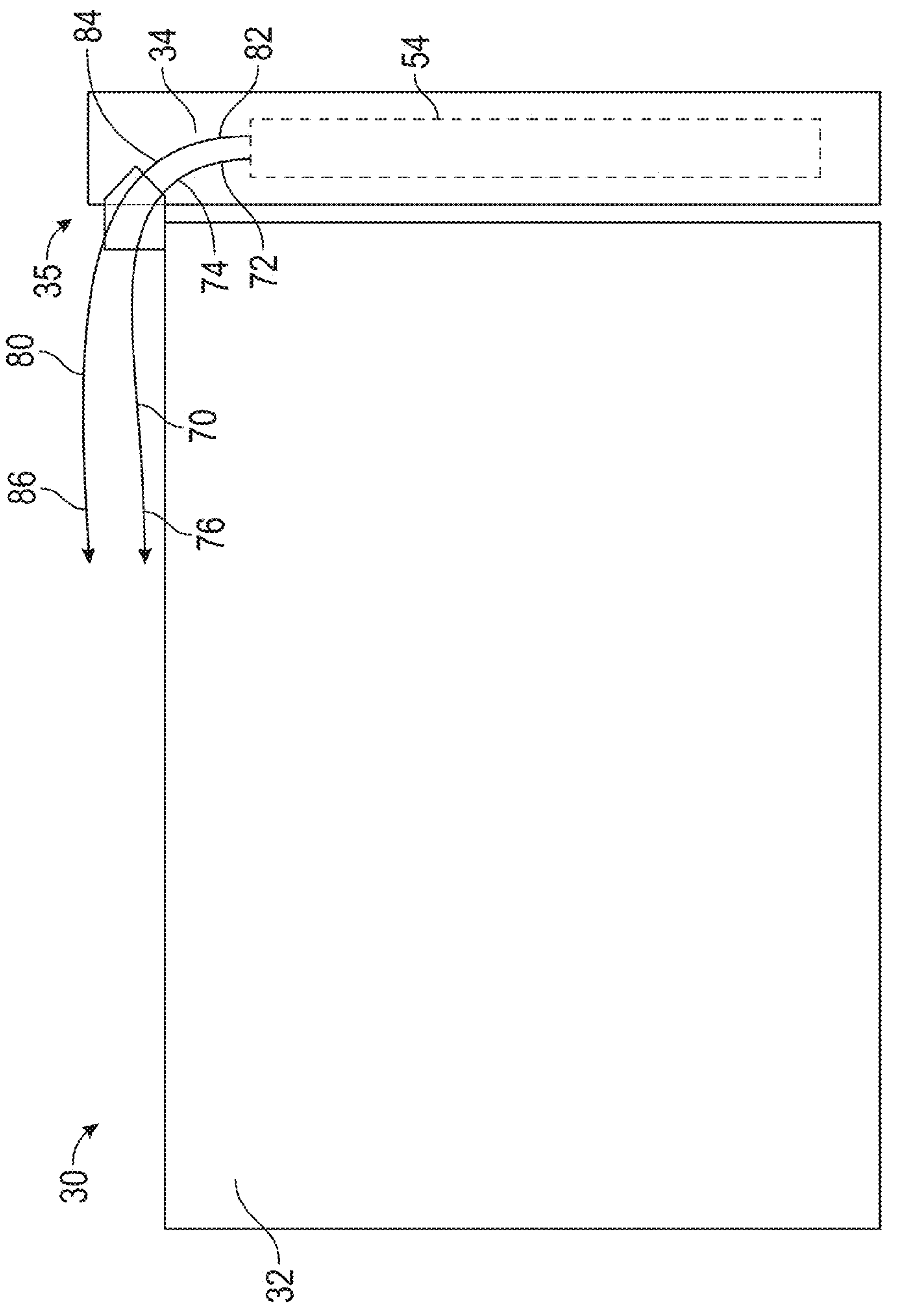
FIG. 11 is another side view of a portion of the refuse vehicle of FIG. 8 with cables and conduits in a second orientation, according to an embodiment.
Figure 12:
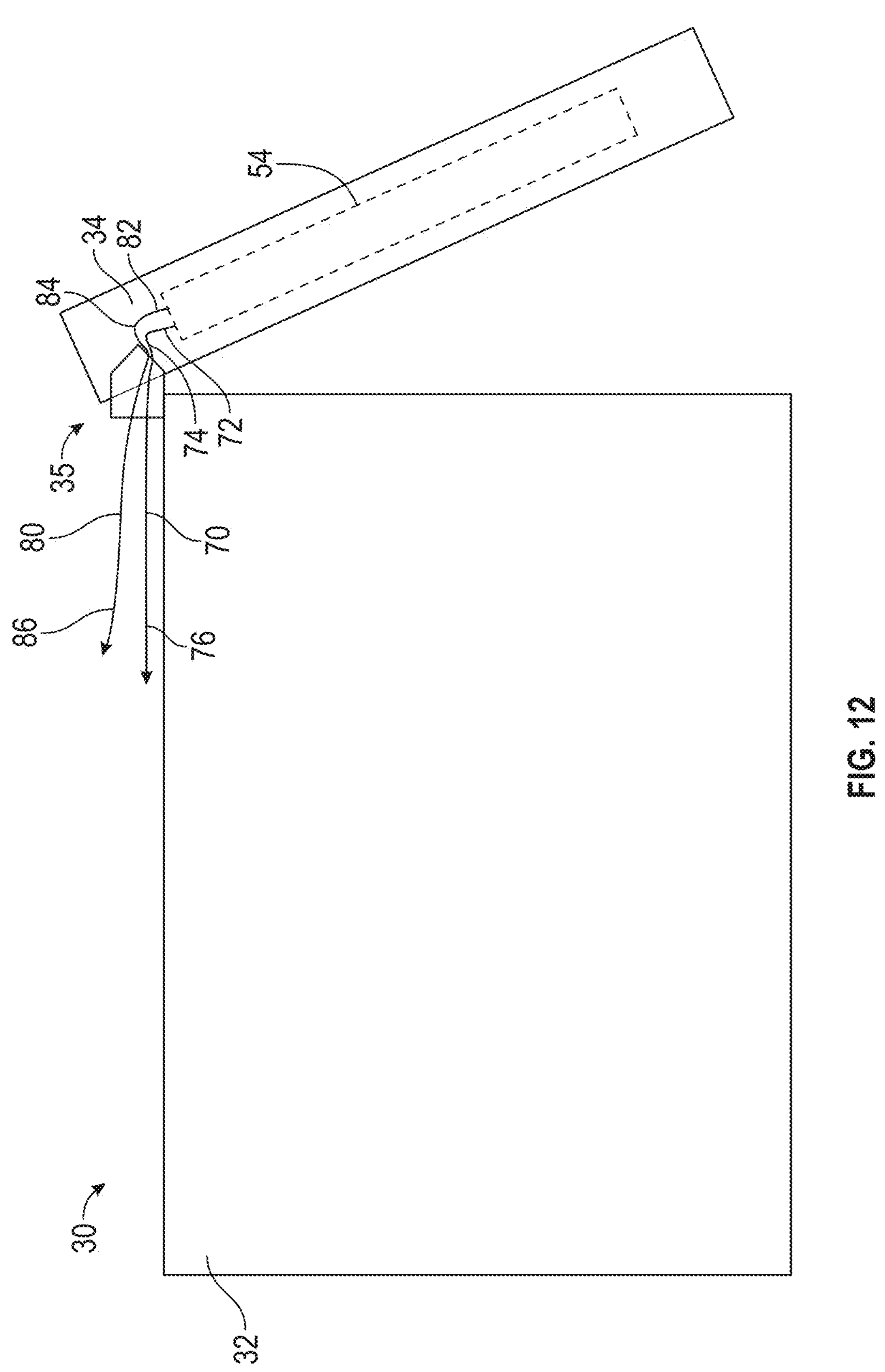
FIG. 12 is another side view of the portion of the refuse vehicle of FIG. 11 with cables and conduits in the second orientation, according to an embodiment.

As shown in FIGS. 11 and 12, the electric cable 70 runs from the tailgate 34, below the pivot of the pivot assembly 35, and onto the cover 36. Thus, in some embodiments, the electric cable 70 may include a 90-degree loop that extends from the tailgate 34, below the pivot of the pivot assembly 35, and onto the cover 36.

As shown in FIG. 12, the electric cable 70 is shown as arranged with reference to FIG. 11, with the tailgate 34 pivoted backwards relative to the refuse compartment 30. As shown, the electric cable 70 runs below the pivot of the pivot assembly 35 as suggested above with reference to FIG. 9 and is flexed (e.g., relative to the position of the electric cable 70 as suggested above with reference to FIG. 9, etc.) to extend onto the cover 36 and connect to the battery 52. In some embodiments, the second cable portion 74 of the electric cable 70 flexes to extend onto the cover 36 while the first cable portion 72 remains static relative to the tailgate 34 and the third cable portion 76 remains static relative to the refuse compartment 30.

As shown in FIGS. 9-12, the refuse vehicle 10 includes a hydraulic conduit 80 (e.g., pipe, hose, etc.) fluidly coupled to the E-PTO system 54 configured to provide hydraulic power (e.g., hydraulic fluid, etc.) from the E-PTO system 54 to the systems of the refuse vehicle 10, according to some embodiments. For example, the hydraulic conduit 80 may be fluidly coupled between the hydraulic pump 58 and configured to provide hydraulic power from the hydraulic pump 58 to the lift assembly 40. In various embodiments, the refuse vehicle 10 includes a plurality of the hydraulic conduits 80 fluidly coupled to the E-PTO system 54 configured to provide hydraulic power from the E-PTO system 54 to the systems of the refuse vehicle 10. For example, a first of the hydraulic conduits 80 may run between the hydraulic pump 58 and actuators of the lift assembly 40 and a second of the hydraulic conduits 80 may run between the hydraulic pump 58 and actuators of the tailgate 34.

As shown in FIGS. 9-12, arrangements of the hydraulic conduit 80 between the E-PTO system 54 and the systems of the refuse vehicle 10 is shown, according to some embodiments. The hydraulic conduit 80 is connected to the E-PTO system 54 coupled to the tailgate 34 rearward of the pivot assembly 35, runs past a pivot (e.g., a pivot pin, etc.) of the pivot assembly 35, and forwards toward the cab 16 until the hydraulic conduit 80 connects to the systems of the refuse vehicle 10. The hydraulic conduit 80 may include a first conduit portion 82 coupled to the tailgate 34, a second conduit portion 84 extending past the pivot assembly 35, and a third conduit portion 86 positioned forward of the pivot assembly 35, according to some embodiments. The first conduit portion 82 and the third conduit portion 86 may be hard conduits (e.g., static conduits, etc.). For example, the first conduit portion 82 may remain static relative to the tailgate 34 when the tailgate 34 moves relative to the refuse compartment 30 and the third conduit portion 86 may remain static relative to the refuse compartment 30 when the tailgate 34 moves relative to the compartment. The second conduit portion 84 may be a flexible conduit (e.g., a moveable line, a flex conduit, a deformable conduit, etc.) configured to move relative to the tailgate 34 and/or the refuse compartment 30 when the tailgate 34 moves relative to the refuse compartment 30 such that the hydraulic conduit 80 can continue to fluidly couple the E-PTO system 54 and the systems of the refuse vehicle 10 when the tailgate 34 is moved relative to refuse compartment 30.

As shown in FIGS. 9 and 10, the hydraulic conduit 80 runs around the pivot of the pivot assembly 35 from below, around the back of the pivot of the pivot assembly 35, and over a top of the pivot of the pivot assembly 35. Thus, in some embodiments, the hydraulic conduit 80 may include a 90-degree loop that extends from the tailgate 34, over the pivot of the pivot assembly 35, and onto the cover 36.

As shown in FIG. 10, the hydraulic conduit 80 is shown as arranged with reference to FIG. 9, with the tailgate 34 pivoted backwards relative to the refuse compartment 30. As shown, the hydraulic conduit 80 runs around the pivot of the pivot assembly 35 as suggested above with reference to FIG. 9 and is flexed (e.g., relative to the position of the hydraulic conduit 80 as suggested above with reference to FIG. 9, etc.) to extend onto the cover 36 and connect to the systems of the refuse vehicle 10. Because the hydraulic conduit 80 runs around the pivot of the pivot assembly 35, the hydraulic conduit 80 does not "hang down" into a gap that is formed between the refuse compartment 30 and the tailgate 34 when the tailgate 34 is moved relative to the refuse compartment 30. In some embodiments, the second conduit portion 84 of the hydraulic conduit 80 flexes to extend onto the cover 36 while the first conduit portion 82 remains static relative to the tailgate 34 and the third conduit portion 86 remains static relative to the refuse compartment 30.

As shown in FIGS. 11 and 12, the hydraulic conduit 80 runs from the tailgate 34, below the pivot of the pivot assembly 35, and onto the cover 36. Thus, in some embodiments, the hydraulic conduit 80 may include a 90-degree loop that extends from the tailgate 34, below the pivot of the pivot assembly 35, and onto the cover 36.

As shown in FIG. 12, the hydraulic conduit 80 is shown as arranged with reference to FIG. 11, with the tailgate 34 pivoted backwards relative to the refuse compartment 30. As shown, the hydraulic conduit 80 runs below the pivot of the pivot assembly 35 as suggested above with reference to FIG. 9 and is flexed (e.g., relative to the position of the hydraulic conduit 80 as suggested above with reference to FIG. 9, etc.) to extend onto the cover 36 and connect to the systems of the refuse vehicle 10. In some embodiments, the second conduit portion 84 of the hydraulic conduit 80 flexes to extend onto the cover 36 while the first conduit portion 82 remains static relative to the tailgate 34 and the third conduit portion 86 remains static relative to the refuse compartment 30.

As shown in FIG. 13, the modular housing 102 containing the E-PTO system 54 may be coupled to on-board refuse container of the body 14, according to some embodiments. The modular housing 102 may be coupled to the panels 32 and/or the cover 36 of the body 14 defining the refuse compartment 30. For example, the modular housing 102 may be coupled to a downward facing surface of the cover 36 such that the modular housing 102 and the E-PTO system 54 are positioned in the compartment. As another example, the modular housing 102 may be coupled to an upward facing surface of the cover 36 such that the modular housing 102 and the E-PTO system 54 are positioned above the refuse compartment 30. As yet another example, the modular housing 102 may be sub flush with the upward facing surface of the cover 36.

As shown in FIG. 13, the modular housing 102 may be configured to be positioned between the cover 36 of the body 14 and top door 38 when the top door 38 is not covering the opening of the refuse compartment 30. For example, when the top door 38 is in a closed configuration, the top door 38 may cover the opening of the refuse compartment to prevent refuse from escaping the refuse compartment 30 and when the top door 38 is in an open orientation, the top door 38 may not cover the opening of the refuse compartment 30 such that the lift assembly 40 may provide additional refuse to the refuse compartment 30 through the opening of the refuse compartment 30. In the open position, the modular housing 102 may be positioned between the top door 38 and the cover 36. In some embodiments, the modular housing 102 may have a profile such that the top door 38 can slide over the modular housing 102 when the top door 38 is moved into the open position. When the top door 38 covers the modular housing 102, the top door 38 may prevent refuse being provided into the refuse compartment 30 by the lift assembly 40 from falling onto the modular housing 102.

As shown in FIG. 13, when the modular housing 102 is coupled to the on-board refuse container, the modular housing 102, and thus the E-PTO system 54, is positioned rearward of the rear plane P2 defined by the exhaust outlet 24 such that an effect of the heat and/or the exhaust gas emitted by the exhaust outlet 24 on the E-PTO system 54 is minimized. The modular housing 102 may be coupled to the on-board refuse container to position the E-PTO system 54 away from the exhaust outlet 24 such that heat and/or exhaust gas emitted by the exhaust outlet 24 does not impact the functionality of the E-PTO system 54. For example, if the E-PTO system 54 is positioned near the exhaust outlet 24, the heat from the exhaust outlet 24 may affect the performance of the electric motor 56 by heating the electric motor 56 and decreasing an efficiency of the electric motor 56. As another example, if the E-PTO system 54 is positioned near the exhaust outlet 24, the exhaust gas emitted by the exhaust outlet 24 may be corrosive and may corrode the conduits and/or cables of the E-PTO system 54. Additionally or alternatively, positioning the modular housing 102 on the on-board refuse container may position the modular housing 102 away from the lift assembly 40 such that refuse lifted by the lift assembly 40 does not fall onto the modular housing 102.

Figure 15:
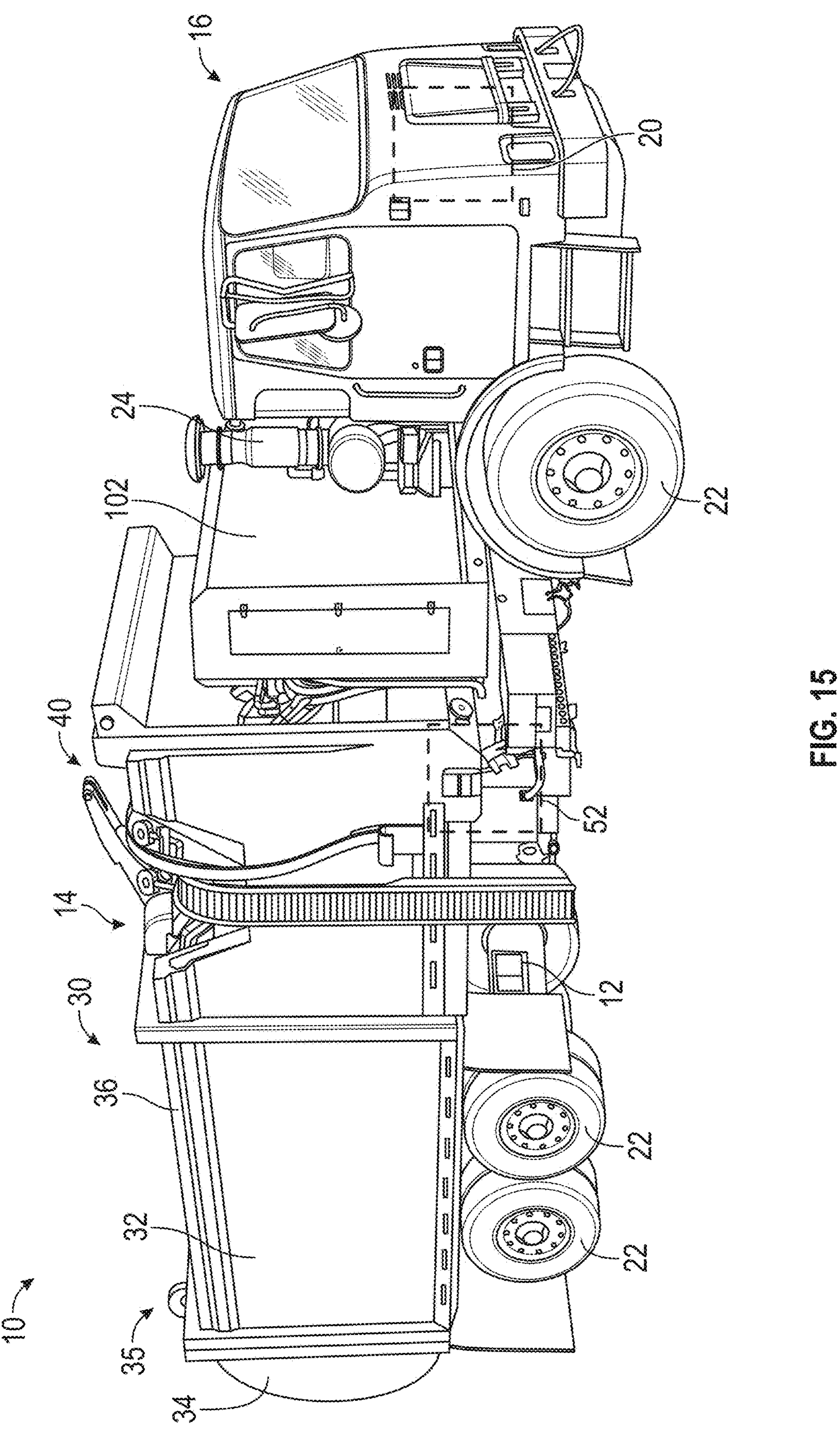
FIG. 15 is a perspective view of a refuse vehicle with the E-PTO module of FIG. 4 in the third position, according to an embodiment.

As shown in FIGS. 14 and 15, the modular housing 102 containing the E-PTO system 54 may be coupled the body 14 and positioned between the refuse compartment 30 and the cab 16, according to some embodiments. For example, the modular housing 102 may be coupled to a forward facing surface (e.g., front surface, etc.) of the body 14 such that the modular housing 102 is positioned between the body 14 and the cab 16. As another example, the modular housing 102 may be sub flush with the forward facing surface of the body 14 and positioned between the refuse compartment 30 and the cab 16.

As shown in FIGS. 14 and 15, when the modular housing 102 is coupled to body 14, the modular housing 102, and thus the E-PTO system 54, is positioned rearward of the rear plane P2 defined by the exhaust outlet 24 such that an effect of the heat and/or the exhaust gas emitted by the exhaust outlet 24 on the E-PTO system 54 is minimized. The modular housing 102 may have a thin profile when the modular housing 102 is positioned between the refuse compartment 30 and the cab 16 such that the modular housing 102 is positioned rearward of the rear plane P2. For example, when the modular housing 102 is coupled to a forward surface of the body 14, a thickness of the modular housing 102 (e.g., a thickness of the modular housing 102 in the direction of travel of the refuse vehicle 10, etc.) may be below a thickness threshold that is equal to a distance between the forward surface of the body 14 and the rear plane P2 such that the modular housing 102 is positioned rearward of the rear plane P2.

The modular housing 102 may be positioned rearward of the rear plane P2 to position the E-PTO system 54 away from the exhaust outlet 24 such that an effect of the heat and/or the exhaust gas emitted by the exhaust outlet 24 on the E-PTO system 54 is minimized. For example, if the E-PTO system 54 is positioned near the exhaust outlet 24, the heat from the exhaust outlet 24 may affect the performance of the electric motor 56 by heating the electric motor 56 and decreasing an efficiency of the electric motor 56. As another example, if the E-PTO system 54 is positioned near the exhaust outlet 24, the exhaust gas emitted by the exhaust outlet 24 may be corrosive and may corrode the conduits and/or cables of the E-PTO system 54.

In other embodiments, the modular housing 102 may be coupled to the cab 16 of the refuse vehicle 10. The modular housing 102 may be coupled to the cab 16 forward of the front plane P1 to position the E-PTO system 54 away from the exhaust outlet 24 such that an effect of the heat and/or the exhaust gas emitted by the exhaust outlet 24 on the E-PTO system 54 is minimized. In some embodiments, when the modular housing 102 is coupled to the cab 16, the electric cable 70 may electrically couple the E-PTO system 54 to the battery 52 and the hydraulic conduit 80 may fluidly couple the E-PTO system 54 to the systems of the refuse vehicle 10 similar to when the modular housing 102 is coupled to the tailgate 34. When the modular housing 102 is coupled to the cab 16, the modular housing 102 may be positioned away from the lift assembly 40 and/or the tailgate 34 such that the lift assembly 40 and/or the tailgate 34 do not contact the modular housing 102 during operation of the lift assembly 40 and/or the tailgate 34.

In various embodiments, the modular housing 102 is selectively repositionable from any of the positions of the modular housing 102 discussed herein to any of the other positions of the modular housing 102 discussed herein. For example, the modular housing 102 may be repositionable from a first position where the modular housing 102 is coupled to tailgate 34 to a second position where the modular housing 102 is coupled to the cover 36. As another example, the modular housing 102 may be repositionable from a first position where the modular housing 102 is coupled to the front surface of the body 14 between the refuse compartment 30 and the cab 16 to a second position where the modular housing 102 is coupled to the tailgate 34 to move the modular housing 102, and thus the E-PTO system 54, further from the exhaust outlet 24.

As utilized herein with respect to numerical ranges, the terms "approximately," "about," "substantially," and similar terms generally mean +/−10% of the disclosed values. When the terms "approximately," "about," "substantially," and similar terms are applied to a structural feature (e.g., to describe its shape, size, orientation, direction, etc.), these terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members, or the two members and any additional intermediate members being integrally formed as a single unitary body with one another or with the two members or the two members and any additional intermediate members being attached to one another.

References herein to the positions of elements (e.g., "top," "bottom," "above," etc.) are merely used to describe the orientation of various elements in the figures. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single-or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general-purpose processor may be a microprocessor, or any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general-purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the refuse vehicle as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present disclosures. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A refuse vehicle comprising:

a chassis;

a body assembly coupled to the chassis;

a prime mover coupled to at least one of the chassis or the body assembly;

an exhaust outlet fluidly coupled to the prime mover, the exhaust outlet configured to emit exhaust gas generated by the prime mover;

a battery configured to store electrical energy received from the prime mover; and an electric power take-off (E-PTO) system comprising a plurality of components positioned within a housing that is coupled to the body assembly, the housing positioned rearward of a plane defined by a rearward surface of the exhaust outlet, the plurality of components of the E-PTO system comprising an electric motor electrically coupled to the battery and a hydraulic pump, the electric motor configured to be driven by electrical energy provided by the battery to drive the hydraulic pump to provide pressurized hydraulic fluid to an accessory of the refuse vehicle, wherein at least one of:

the body assembly comprises a body defining a refuse compartment configured to store refuse, the body comprising a roof portion defining a top portion of the refuse compartment, the housing of the E-PTO system coupled to the roof portion of the body assembly at a first location rearward of the plane, wherein at least one of:

the body assembly further comprises a tailgate pivotably coupled to the body, the housing of the E-PTO system being a modular housing that is selectively repositionable on the body assembly between being coupled to the roof portion of the body assembly at the first location and the tailgate of the body assembly at a second location rearward of the plane;

the housing of the E-PTO system is coupled to a downward facing surface of the roof portion such that the plurality of components are positioned within the refuse compartment; or the housing of the E-PTO system is positioned between a top door of the body assembly and the roof portion when the top door is in an open configuration, the top door movably coupled to the top portion, the top door repositionable between a closed configuration where the top door covers an opening defined in the top portion and configured to provide access into the refuse compartment through the top portion and the open configuration where at least a portion of the opening is not covered by the top door;

the refuse vehicle further comprises a cab coupled to the chassis forward of the body assembly, the housing of the E-PTO system coupled to the body assembly at a location rearward of the plane, the location positioned between the cab and the body assembly such that at least a portion of the housing is positioned between the cab and the body assembly; or the body assembly comprises a body defining a refuse compartment configured to store refuse and the tailgate pivotably coupled to the body by a pivot connection, the tailgate configured to pivot relative to the body between an open configuration and a closed configuration, the housing of the E-PTO system coupled to the tailgate a location rearward of the plane.

2. The refuse vehicle of claim 1, wherein:

the body assembly comprises the body defining the refuse compartment and the tailgate pivotably coupled to the body by a pivot connection;

the housing of the E-PTO system is coupled to the tailgate a location rearward of the plane; and the E-PTO system further comprises:

an electric cable electrically coupled between the battery and the electric motor, the electric cable comprising a first cable portion coupled to the tailgate, a second cable portion coupled to the body, and an intermediate cable portion extending between the first cable portion and the second cable portion;

wherein the intermediate cable portion is a deformable cable configured to deform when the tailgate is moved between the open configuration and the closed configuration.

3. The refuse vehicle of claim 2, wherein a portion of the intermediate cable portion extends over a top of the pivot connection.

4. The refuse vehicle of claim 2, wherein a portion of the intermediate cable portion extends between the pivot connection and the body.

5. The refuse vehicle of claim 1, wherein:

the body assembly comprises the body defining the refuse compartment and the tailgate pivotably coupled to the body by a pivot connection;

the housing of the E-PTO system is coupled to the tailgate a location rearward of the plane;

the E-PTO system further comprises:

a hydraulic conduit fluidly coupled between the hydraulic pump and the accessory, the hydraulic conduit comprising a first conduit portion coupled to the tailgate, a second conduit portion coupled to the body, and an intermediate conduit portion extending between the first conduit portion and the second conduit portion; and the intermediate conduit portion is a deformable conduit configured to deform when the tailgate is moved between the open configuration and the closed configuration.

6. The refuse vehicle of claim 5, wherein a portion of the intermediate conduit portion extends over a top of the pivot connection.

7. The refuse vehicle of claim 5, wherein a portion of the intermediate conduit portion extends between the pivot connection and the body.

8. A refuse vehicle comprising:

a chassis;

a body assembly coupled to the chassis;

a cab coupled to the chassis forward of the body assembly;

a prime mover coupled to at least one of the chassis and the body assembly;

an exhaust outlet fluidly coupled to the prime mover, the exhaust outlet configured to emit exhaust gas generated by the prime mover, a forward surface of the exhaust outlet defining a first plane, a rearward surface of the exhaust outlet defining a second plane;

a battery configured to store electrical energy; and an electric power take-off (E-PTO) system comprising a plurality of components positioned within a housing that is coupled to at least one of the body assembly or the cab, the housing positioned outside of an exhaust region defined between the first plane and the second plane, the plurality of components of the E-PTO system comprising an electric motor electrically coupled to the battery and a hydraulic pump, the electric motor configured to be driven by electrical energy provided by the battery to drive the hydraulic pump to provide pressurized hydraulic fluid to an accessory of the refuse vehicle, wherein at least one of:

the body assembly comprises a body defining a refuse compartment configured to store refuse, the body comprising a roof portion defining a top portion of the refuse compartment and a tailgate pivotably coupled to the body, the tailgate configured to pivot relative to the body between an open configuration and a closed configuration, the housing coupled to the tailgate at a location rearward of the second plane;

the housing of the E-PTO system is a modular housing that is selectively repositionable on the at least one of the body assembly or the cab between being coupled to the at least one of the body assembly or the cab at two or more locations outside of the exhaust region; or the housing of the E-PTO system is a modular housing that is selectively repositionable on the at least one of the body assembly or the cab between being coupled to the at least one of the body assembly or the cab at two or more locations outside of the exhaust region.

9. A refuse vehicle comprising:

a chassis;

a body assembly coupled to the chassis, the body assembly comprising:

a body defining a refuse compartment configured to store refuse, and a tailgate pivotably coupled to the body by a pivot connection, the tailgate configured to pivot relative to the body between an open configuration and a closed configuration;

a battery coupled to at least one of the chassis or the body assembly, the battery configured to store electrical energy; and an electric power take-off (E-PTO) system comprising a plurality of components positioned within a housing that is coupled to the tailgate, the plurality of components of the E-PTO system comprising an electric motor electrically coupled to the battery and a hydraulic pump, the electric motor configured to be driven by electrical energy provided by the battery to drive the hydraulic pump to provide pressurized hydraulic fluid to an accessory of the refuse vehicle.

10. The refuse vehicle of claim 9, wherein the E-PTO system further comprises:

an electric cable electrically coupled between the battery and the electric motor, wherein at least a portion of the electric cable extends over a top of the pivot connection; and a hydraulic conduit fluidly coupled between the hydraulic pump and the accessory, wherein at least a portion of the electric cable extends over the top of the pivot connection.

11. The refuse vehicle of claim 9, wherein the E-PTO system further comprises:

an electric cable electrically coupled between the battery and the electric motor, wherein at least a portion of the electric cable extends between the pivot connection and the body; and a hydraulic conduit fluidly coupled between the hydraulic pump and the accessory, wherein at least a portion of the electric cable extends between the pivot connection and the body.

* * * * *